(12) United States Patent
Ohara et al.

(10) Patent No.: US 7,615,296 B2
(45) Date of Patent: Nov. 10, 2009

(54) FUEL CELL SYSTEM

(75) Inventors: Hideo Ohara, Osaka (JP); Masataka Ozeki, Osaka (JP); Akinari Nakamura, Osaka (JP); Yoshikazu Tanaka, Osaka (JP); Shigeki Yasuda, Osaka (JP); Takashi Nishikawa, Nara (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 11/547,562

(22) PCT Filed: Aug. 4, 2005

(86) PCT No.: PCT/JP2005/014281

§ 371 (c)(1),
(2), (4) Date: Oct. 5, 2006

(87) PCT Pub. No.: WO2006/013917

PCT Pub. Date: Feb. 9, 2006

(65) Prior Publication Data

US 2007/0212582 A1    Sep. 13, 2007

(30) Foreign Application Priority Data

Aug. 6, 2004 (JP) ............... 2004-230326

(51) Int. Cl.
H01M 8/04    (2006.01)
(52) U.S. Cl. .......................... 429/25; 429/22
(58) Field of Classification Search ........... 429/26, 429/25, 22
See application file for complete search history.

(56) References Cited

U.S. PATENT DOCUMENTS 6,579,637 B1    6/2003    Savage et al.

2002/0129793 A1    9/2002    Tokuo et al.
2003/0054212 A1    3/2003    Ueda et al.

FOREIGN PATENT DOCUMENTS

| JP | 61228201 | | 10/1986 |
|---|---|---|---|
| JP | 05-013094 | * | 1/1993 |
| JP | 513094 | | 1/1993 |
| JP | 08-185883 | * | 7/1996 |
| JP | 8185883 | | 7/1996 |
| JP | 10300007 | | 11/1998 |
| JP | 2000-304895 | * | 11/2000 |

(Continued)

OTHER PUBLICATIONS

PCT International Search Report dated Nov. 8, 2005.

Primary Examiner—Patrick Ryan
Assistant Examiner—Thomas H. Parsons
(74) Attorney, Agent, or Firm—Dickinson Wright, PLLC

(57) ABSTRACT

A fuel cell system includes a fuel cell configured to generate power by consuming a fuel gas and having an outlet port through which the fuel gas flows out; a moisture removal unit configured to remove moisture contained in the fuel gas that has been sent through the outlet port; a burner located downstream of the moisture removal unit to combust the fuel gas; and a gas pipe on-off valve configured to open and close a pipe that makes the moisture removal unit and the burner communicate with each other, and the fuel cell system is designed such that the gas pipe on-off valve closes when the power generation stops.

4 Claims, 4 Drawing Sheets

FOREIGN PATENT DOCUMENTS

| | | | |
|---|---|---|---|
| JP | 20028693 | | 1/2002 |
| JP | 2002-134145 | * | 5/2002 |
| JP | 2002134145 | | 5/2002 |
| JP | 2002-274806 | * | 9/2002 |
| JP | 2002250453 | | 9/2002 |
| JP | 2002274806 | | 9/2002 |
| JP | 2002276506 | | 9/2002 |
| JP | 2004-071471 | * | 3/2004 |
| JP | 200471471 | | 3/2004 |
| JP | 2004152540 | | 5/2004 |
| JP | 200571926 | | 3/2005 |
| WO | 0197312 | | 12/2001 |

* cited by examiner

FUEL CELL SYSTEM

TECHNICAL FIELD

The present invention relates to fuel cell systems and more particularly to emergency stop techniques for coping with a power failure etc. in a fuel cell system.

BACKGROUND ART

Fuel cell systems are typically designed to generate power through a reaction between a hydrogen-rich fuel gas and air within a fuel cell, the fuel gas being supplied as a reducing gas to the anode of the fuel cell whereas air is supplied as an oxidizing gas to the cathode. The fuel gas is generally produced from a raw material gas (such as city gas) and vapor by causing a steam reforming reaction in a fuel treating unit called "reformer".

While the fuel cell systems are in operation, a portion of the fuel gas supplied to the anode of the fuel cell flows back to the burner as an offgas and is combusted in the burner to be utilized as a heat source for the fuel treating unit. Therefore, the fuel treating unit, fuel cell and various pipes are full of combustible fuel gas.

There have been proposed appropriate post-treatment (purge treatment) techniques for treating the fuel gas that fills up such fuel cell systems when they are shut down. As one example of such techniques, an air purge technique for finally purging the fuel gas by air has been introduced (see e.g., Patent Document 1).

According to Patent Document 1, while power generation in the fuel cell is stopped, the hydrogen-containing fuel gas remaining in the fuel gas passage is evacuated using vapor which has been generated from water supplied from the water feeding device to the fuel treating unit, and then, air is made to flow from a purging air feeding device into the fuel gas passage, thereby finally effecting an air purge. In this fuel cell system, after the hydrogen gas in the fuel cell has been thus eliminated using vapor, air is supplied to the inside of the fuel cell, whereby the corrosion of the passages by moisture beads generated from the vapor can be prevented.

Such an air purge treatment technique can eliminate the need for a nitrogen gas storage tank and is therefore economically effective, compared to the conventional nitrogen gas purge treatment technique according to which upon stopping of the power generation of the fuel cell system, an inert gas (nitrogen gas) flows into the burner by way of the fuel treating unit and the fuel cell, thereby guiding the gas (fuel gas etc.) remaining in the unit and fuel cell to the burner to make it undergo a treatment in the burner.

Patent Document 1: International Publication Gazette No. 01/97312

DISCLOSURE OF THE INVENTION

The Problems That the Invention is to Solve

The fuel cell system disclosed in Patent Document 1 can perform a normal shutdown operation by properly controlling the whole system including the fuel treating unit, the burner and others, while achieving a cost reduction in the purge treatment. However, there still remains a question as to whether this fuel cell system can perform an appropriate, expeditious shutdown operation in the event of an emergency stop situation such as a power failure.

For instance, there is concern that, in the event of an emergency stop, the fuel gas, which fills the pipe for connecting the fuel cell to the burner, might diffuse in the burner that is kept at high temperature (e.g., about 600° C.) for the reason described later. And, if the fuel gas diffusing in and leaking to the burner mixes with air leaking from the exhaust port of the burner so that the fuel gas is diluted to a combustible concentration range, abnormal combustion of the mixed gas will occur in the vicinity of the burner.

More specifically, for a certain period of time after an emergency stop of the fuel cell system, a steam reforming reaction proceeds between unreacted raw material gas remaining in the fuel treating unit and the heat of the fuel generator kept at high temperature. Since the steam reforming reaction in the fuel treating unit is represented by the following equation (1), the volume of the gas existing in the fuel cell system increases as the steam reforming reaction proceeds and the fuel gas filling up the pipe etc. is pushed to the downstream side by the gas increasing in volume so that the fuel gas diffuses into the burner.

The intentional vapor generation within the fuel treating unit (it should be noted that the vapor generation requires an auxiliary power supply in case of a power failure) such as disclosed in Patent Document 1 is rather undesirable, because it has the opposite effect of promoting the diffusion of the fuel gas into the burner.

$$CH_4 + 2H_2O \rightarrow CO_2 + 4H_2 \tag{1}$$

As a measure, it is conceivable to replace the fuel gas (combustible gas) with an inert gas at a time by employing an arrangement in which an inert gas such as nitrogen gas is quickly introduced into the fuel cell system using power from an auxiliary power supply in the event of an emergency stop situation such as a power failure. However, the use of such an arrangement goes counter to provision of a simple piping arrangement which does not involve an auxiliary power supply nor inert gas and an economical fuel cell system.

The invention has been made taking the above problems into account, and a primary object of the invention is therefore to provide a fuel cell system capable of performing an appropriate and expeditious shutdown operation without use of an auxiliary power supply and inert gas (nitrogen gas) in the event of an emergency stop situation such as a power failure.

Means for Solving the Problems

The inventors thought it useful for accomplishing the above object to provide a gas pipe on-off valve that closes in the event of an unexpected situation such as a power failure and is located in place within a pipe that extends from the anode of the fuel cell to the burner (more concretely, this pipe corresponds to the fuel gas return pipe 105 and combustion fuel gas pipe 106 described later in "Description of Embodiments").

In a typical fuel cell system, a vapor-containing hydrogen gas (hereinafter referred to as "hydrogen gas") that has been generated by the fuel treating unit and has not been supplied to the anode or a vapor-containing offgas that has been generated by the fuel treating unit and supplied to the anode is fed to the burner as a fuel gas in order to obtain heat required for the reforming reaction in the fuel treating unit. The components of the hydrogen gas or offgas that do not contribute to the combustion of the fuel gas such as moisture (vapor and water droplets) consume extra energy for their temperature rise, and therefore they are one factor of decreasing the energy efficiency of the fuel cell system. To solve this, the fuel cell systems include, as standard equipment, a moisture removal unit that is placed in the fuel gas pipe leading to the burner and removes the moisture contained in the hydrogen gas or offgas to store it in the form of condensed water.

Regarding the position of the pipe provided with the gas pipe on-off valve that closes in the event of an unexpected situation such as a power failure, the following knowledge has been obtained provided that the above pipe is provided with the moisture removal unit.

That is, it was found that the following problem arose if the gas pipe on-off valve was placed in a part of the pipe (hereinafter referred to as "upstream pipe portion") that is positioned on the upstream side of the moisture removal unit with respect to a fuel gas flowing direction.

As the inside temperature of the moisture removal unit increases during the power generation period, the temperature of condensed water accumulated in the moisture removal unit increases. If the upstream pipe portion is closed by the gas pipe on-off valve when the power generation of the fuel cell is stopped in the above condition, the condensed water having high temperature (e.g., 70 to 80° C. just after the stop of the power generation) evaporates, which causes the gas containing a large amount of vapor and existing within the moisture removal unit to flow into the burner by way of a part of the pipe (hereinafter referred to as "downstream pipe portion") that is positioned on the downstream side of the moisture removal unit with respect to the fuel gas flowing direction. Thereafter, as the components and pipes of the fuel cell system gradually become cold, dew condensation occurs from the gas containing a large amount of vapor. The condensed water droplets come to adhere to the inner surface of the pipes and the inside of the burner. Such condensed water droplets may cause accidental fire or incomplete combustion in the burner at the next start of combustion in the burner and as a result, incomplete combustion gas such as CO gas may be generated.

The gas existing in the moisture removal unit contains combustible gas such as hydrogen gas. If this gas flows into the burner kept at high temperature, mixing with air leaking through the exhaust port of the burner, the mixed gas may cause abnormal combustion within the burner.

In view of such a problem presented by the fuel cell system, the inventors have come to the conclusion that it is important to provide the downstream pipe portion located between the moisture removal unit and the burner with the gas pipe on-off valve that closes in the event of an unexpected situation such as a power failure.

Specifically, there has been provided, in accordance with the present invention, a fuel cell system comprising:

a fuel cell configured to generate power by consuming a fuel gas and having an outlet port through which the fuel gas that has not been consumed in the power generation flows out;

a moisture removal unit configured to remove moisture contained in the fuel gas that has been sent through the outlet port;

a burner located downstream of the moisture removal unit, for combusting the fuel gas; and a gas pipe on-off valve configured to open and close a pipe that makes the moisture removal unit and the burner communicate with each other, wherein the gas pipe on-off valve closes when the power generation stops.

In the above system, the gas pipe on-off valve is closed quickly in the event of an emergency stop situation such as a power failure, thereby preventing the combustible fuel gas that pervades the fuel cell system from leaking into the burner, so that the fuel cell system can properly perform an emergency shutdown operation.

In addition, since the gas pipe on-valve is placed in the pipe that makes the moisture removal unit and the burner communicate with each-other, the combustible gas in the moisture removal unit does not disperse into the burner.

Further, since the gas pipe on-off valve is placed in the pipe that makes the moisture removal unit and the burner communicate with each other, the vapor contained in the inner gas of the moisture removal unit does not flow into the burner, being entrained by the gas. As a result, the problems that arise at the time of subsequent combustion such as accidental fire and incomplete combustion occurring in the burner owing to dew condensation from the vapor can be properly dealt with.

The fuel cell system may further comprise a fuel treating unit configured to generate the fuel gas from a raw material gas and vapor and may be designed such that heat generated by combusting the fuel gas in the burner is supplied to the fuel treating unit.

Preferably, the gas pipe on-off valve is a normally-closed type on-off valve that operates to close the pipe when it is in a normal state. The gas pipe on-off valve may comprise of, for example, an electromagnetic valve that closes the gas pipe when application of current to the valve is stopped.

This is useful, because the gas pipe on-off valve can be automatically closed in the event of a power failure without use of an auxiliary power supply.

The fuel cell system may have a gas pressure escape mechanism that is located upstream of the gas pipe on-off valve and configured to let out gas with the flow of the gas blocked by closing the gas pipe on-off valve during stop of the power generation. As one example of the gas pressure escape mechanism, a first water passage pipe will be described later.

The moisture removal unit includes, in one form, a heat exchanger section having a region where the fuel gas flows and a water receiving section configured to store condensed water generated from moisture contained in the fuel gas, and the fuel gas is cooled by heat exchange in the heat exchanger section. It should be noted that the moisture contained in the fuel gas discussed herein includes the fine water droplets and vapor existing in the fuel gas and, in sort, the moisture is the components associated with water that interferes with the combustion of the fuel gas.

In addition, the fuel cell system may include baffle plate that is disposed in the region where the fuel gas flows, for decelerating the fuel gas.

This arrangement speeds up the removal of the moisture contained in the fuel gas to bring the fuel gas into a combustible condition in the burner, while assuring a passage for the fuel gas. This arrangement also enables it to collect condensed water in the water receiving section thereby preventing an escape of the fuel gas into atmosphere.

The fuel cell system may include a water level detector configured to detect the water level of the condensed water accumulated in the water receiving section and a controller, and this controller may control the water level of the condensed water based on a detection signal outputted from the water level detector.

Thereby, the water level of the condensed water can be properly detected and maintained.

Further, the fuel cell system may include a first water passage pipe that communicates with the water receiving section and extends so as to have an open end that is positioned higher than the water level of the condensed water, opening to atmosphere when the inner pressure of the moisture removal unit is positive pressure relative to atmospheric pressure. The first water passage pipe is disposed such that while a portion of the condensed water being introduced as in-pipe water into the first water passage pipe by utilizing the differential pressure between the inner pressure and atmospheric pressure, the water level of the in-pipe water existing in the first water passage pipe rises higher than the water level of the condensed water.

With this arrangement, the function of a gas seal is given to the in-pipe water (condensed water) existing in the first water passage pipe, so that the fuel gas can be confined in the moisture removal unit without use of an electromagnetic valve. In addition, the function of the gas pressure escape mechanism may be given to the first water passage pipe. This makes it possible to discharge the fuel gas to the outside through the first water passage pipe by ejecting the in-pipe water (condensed water) existing in the first water passage pipe, even if abnormal combustion occurs in the fuel cell system in the event of an unexpected situation such as a power failure. As a result, an abrupt pressure rise within the fuel cell system can be prevented.

Use of such a gas pressure escape mechanism utilizing a water seal is desirable since it enables stable gas sealing even if its popping pressure (set value) is low, compared to gas pressure escape valves having an existing rubber seal.

The water level of the condensed water may be controlled so as to be kept higher than the lower limit of the water level derived from the inner volume of the first water passage pipe.

For instance, the volume corresponding to the sum of the amount of the condensed water and the amount of the in-pipe water may be greater than the inner volume of the first water passage pipe.

Thereby, the operation of the fuel cell system can be controlled while the water level of the condensed water being kept higher than its lower limit, so that exhaustion of the condensed water in the water receiving section can be prevented without fail.

The fuel cell system may comprise a water storage tank for storing water; a second water passage pipe configured to make the water receiving section and the water storage tank communicate with each other; and a water pipe on-off valve configured to open and close the second water passage pipe. The water level of the condensed water accumulated in the water receiving section and the water level of the water stored in the water storage tank are controlled such that water is allowed to flow from the water storage tank to the water receiving section by opening the water pipe on-off valve.

Thereby, the water receiving section can be quickly replenished with water from the water storage tank even if the condensed water in the water receiving section runs short.

The water pipe on-off valve is preferably a normally-open type on-off valve that operates to open the second water passage pipe when it is in a normal state. The water pipe on-off valve may comprise of, for example, an electromagnetic valve that opens the second water passage pipe when application of current to the valve is stopped.

This is useful, because the gas pipe on-off valve can be automatically opened in the event of a power failure without use of an auxiliary power supply.

There is provided a fuel cell system comprising:

a fuel treating unit configured to generate a fuel gas from a raw material gas and vapor;

a raw material gas feeder configured to supply the raw material gas to the fuel treating unit;

a moisture removal unit having a water receiving section configured to accumulate condensed water generated from the moisture contained in the fuel gas sent through the outlet port;

a water level detector configured to detect the water level of the condensed water; and a controller, wherein the water level detector detects the lower limit of the water level of the condensed water to output to the controller as a detection signal, and wherein the controller determines based on the detection signal whether or not the raw material gas is to be supplied using the raw material gas feeder.

More specifically, the controller stops a supply of the raw material gas using the raw material gas feeder, if the water level is equal to or lower than the lower limit.

Thereby, the controller determines whether a supply of the raw material gas is necessary while checking the water level of the condensed water relative to its lower limit, so that exhaustion of the condensed water can be prevented without fail.

Where the fuel cell system includes the first water passage pipe that communicates with the water receiving section and extends so as to have an open end that is positioned higher than the water level of the condensed water, opening to atmosphere when the inner pressure of the moisture removal unit is positive pressure relative to atmospheric pressure, the lower limit detected by the water level detector is derived from the inner volume of the first water passage pipe.

There is provided a fuel cell system comprising: a water storage tank for storing water; a second water passage pipe configured to make the water receiving section and the water storage tank communicate with each other; and a water pipe on-off valve configured to open and close the second water passage pipe, wherein the controller opens the water pipe on-off valve at least until the water level exceeds the lower limit, so that the water stored in the water storage tank is replenished to the water receiving section through the second water passage pipe.

At the time the water level exceeds the lower limit, the controller controls the raw material gas feeder so as to supply the raw material gas, while closing the water pipe on-off valve.

Thereby, the controller determines whether a supply of the raw material gas is necessary while checking the water level of the condensed water relative to its lower limit, so that exhaustion of the condensed water can be prevented without fail. In addition, even if the condensed water runs short, water can be quickly replenished from the water storage tank. As a result, the operational efficiency of the fuel cell system can be promoted.

These objects as well as other objects, features and advantages of the invention will become apparent to those skilled in the art from the following detailed description of preferred embodiments with reference to the accompanying drawings.

EFFECTS OF THE INVENTION

The invention provides a fuel cell system capable of appropriate expeditious shutdown operation in the event of an emergency stop situation such as a power failure, without use of an auxiliary power supply or inert gas.

EXPLANATION OF REFERENCE NUMERALS

Figure 1:
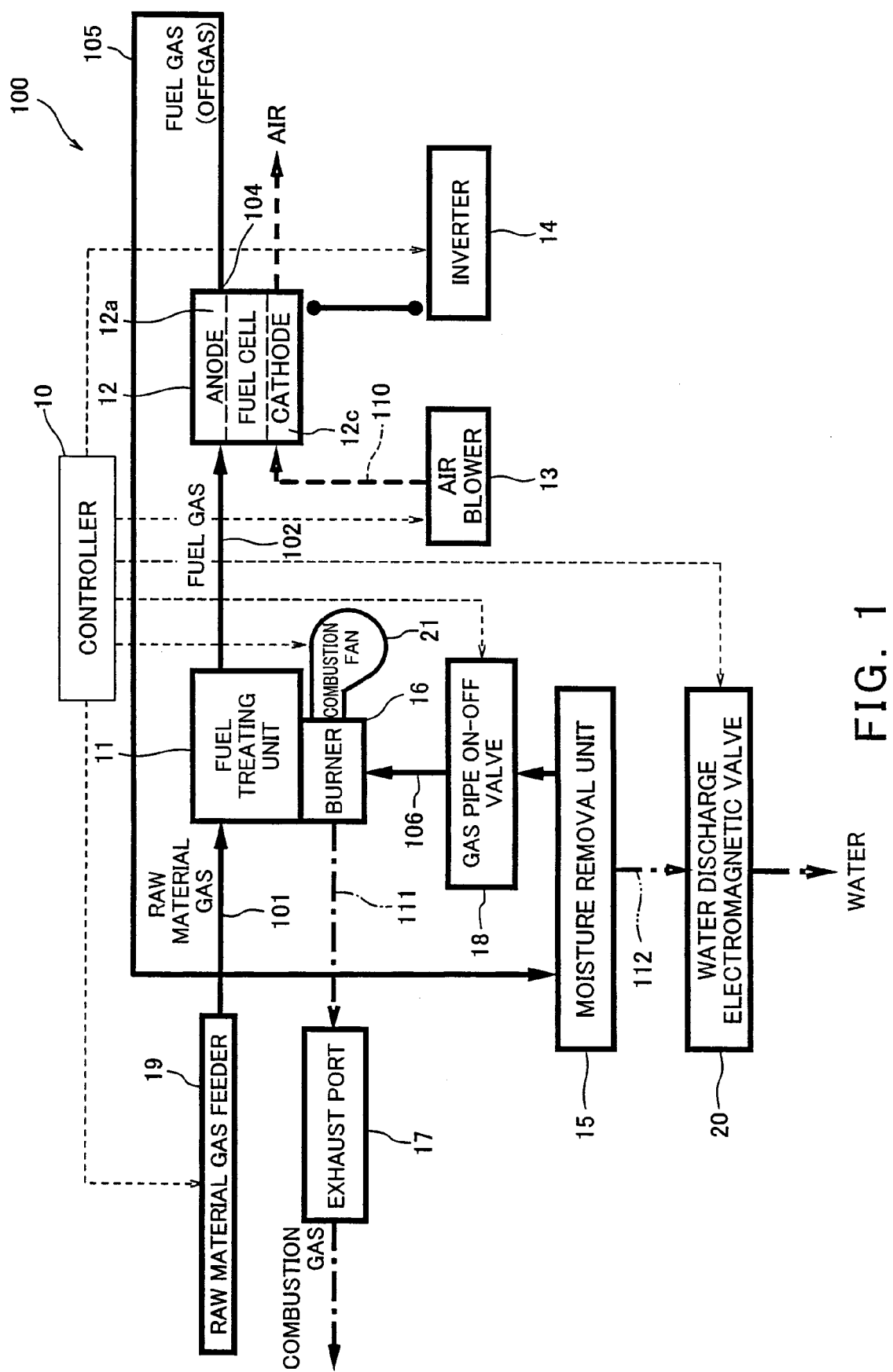
FIG. 1 is a block diagram of the configuration of a fuel cell system constructed according to a first embodiment of the invention.

10: controller
11: fuel treating unit
12: fuel cell
12a: anode of fuel cell
12c: cathode of fuel cell
13: air blower
14: inverter
15: moisture removal unit
16: burner
17: exhaust port
18: gas pipe on-off valve
19: raw material gas feeder
20: water discharge electromagnetic valve
21: combustion fan
30: passage area for fuel gas (offgas)
31: condensed water
31u: upper limit of water level of condensed water
31d: lower limit of water level of condensed water
31f: water level of condensed water
32: first water passage pipe
32u: open end
33: water level detector
34: in-pipe water
34f: water level of in-pipe water
35: vertical portion
40: fuel gas inlet
41: fuel gas outlet
42: water outlet
43: radiating fin
44: baffle plates
45: frame
46: water receiving section
47: heat exchanger section
48: lid
49: bottom
100: fuel cell system
101: raw material gas feed pipe
102: fuel gas feed pipe
104: outlet port
105: fuel gas return pipe
106: combustion fuel gas pipe
110: air pipe
111: combustion gas passage
112: water exhaust pipe
120: second water passage pipe
121: water pipe on-off valve
122: water storage tank
123: reserve water
123f: water level of reserve water

BEST MODE FOR CARRYING OUT THE INVENTION

Referring now to the accompanying drawings, preferred embodiments of the invention will be described below.

First Embodiment

FIG. 1 is a block diagram illustrating the configuration of a fuel cell system constructed according to a first embodiment of the invention.

A fuel cell system 100 is chiefly comprised of: a fuel cell 12 for generating power by consuming a reducing gas (hydrogen-rich fuel gas) and oxidizing gas (air); an inverter 14 for converting d.c. power generated by the fuel cell 12 into a.c. power; a fuel treating unit 11 for feeding the fuel gas to an anode 12a of the fuel cell 12; an air blower 13 for feeding air to a cathode 12c of the fuel cell 12; a moisture removal unit 15 for removing the moisture contained in the fuel gas (offgas) remaining without being consumed in the fuel cell 12 from an outlet port 104 of the anode 12a; a burner 16 for taking air in from an air intake and mixing/combusting the air and the fuel gas to supply heat to the fuel treating unit 11; and a raw material gas feeder 19 for feeding a raw material gas such as city gas to the fuel treating unit 11.

Herein, the fuel treating unit 11 generally includes, therein, a reformer (not shown) for generating a reformed gas by the steam reforming reaction between the raw material gas and vapor; a shifter (not shown) for causing a shift reaction to transform vapor and carbon monoxide gas into hydrogen gas and carbon dioxide gas; a purifier (not shown) for reducing carbon monoxide content to about 10 ppm or less through selective CO oxidation. Therefore, the reformer includes a reforming catalyst body (not shown) for promoting a reforming reaction, and the burner 16 described earlier is used as a heat feeding device for supplying reaction heat to the reforming catalyst body. Further, after the fuel gas in the burner 16 is mixed with air sent from a combustion fan 21 to be diluted to a combustible concentration range, this mixed gas is combusted within the burner 16 thereby generating high-temperature combustion gas which is in turn heat-exchanged with the reforming catalyst body, so that the reforming catalyst body is heated. The combustion gas which has been subjected to the heat exchange with the reforming catalyst body is released to atmosphere through an exhaust port 17.

The piping system and pipe valves of the fuel cell system 100 are comprised of: an air pipe 110 that serves as an oxidizing gas passage for guiding air from the air blower 13 to the cathode 12c of the fuel cell 12 and releasing remaining air flowing out from the cathode 12c to atmosphere; a raw material gas feed pipe 101 for guiding a raw material gas for power generation from the raw material gas feeder 19 to the fuel treating unit 11; a fuel gas feed pipe 102 for guiding fuel gas flowing out from the fuel treating unit 11 to the anode 12a of the fuel cell 12; a fuel gas return pipe 105 for flowing remaining fuel gas from the outlet port 104 of the anode 12a to the moisture removal unit 15; a combustion fuel gas pipe 106 for guiding fuel gas from which moisture has been removed by the moisture removal unit 15 to the burner 16; a gas pipe on-off valve 18 provided in the combustion fuel gas pipe 106 that makes the burner 16 and the moisture removal unit 15 communicate with each other, for opening and closing the combustion fuel gas pipe 106; a combustion gas passage 111 for guiding the combustion gas generated in the burner 16 to the exhaust port 17; a water exhaust pipe 112 disposed at the bottom 49 (see FIG. 2) of the moisture removal unit 15, for guiding condensed water 31 accumulated in the moisture removal unit 15 to the outside (e.g., to a condensed water tank); and a water discharge electromagnetic valve 20 disposed in the water exhaust pipe 112, for discharging the condensed water 31 to the outside, by periodically opening and closing the water exhaust pipe 112.

The gas pipe on-off valve 18 may be a normally-closed type on-off valve that operates to close the combustion fuel gas pipe 106 when it is in a normal state and, more particularly, comprises of an electromagnetic valve for opening the combustion fuel gas pipe 106 when current is applied thereto and closing the gas pipe 106 when current application is stopped. By this arrangement, the gas pipe on-off valve 18 automatically operates to close itself without use of an auxiliary power supply, thereby allowing the fuel cell system 100 to properly perform the emergency shutdown operation in the event of an unexpected situation such as a power failure.

In the combustion fuel gas pipe 106 that makes the moisture removal unit 15 and the burner 16 communicate with each other, the gas pipe on-off valve 18 is disposed at a position close to the burner 16 as much as possible, whereby the diffusion of the fuel gas into the burner 16 at the time of an emergency shutdown of the fuel cell system 100 can be kept to the minimum. In short, a leakage of combustible gas to the burner 16 that could be a source of abnormal combustion of the fuel gas can be prevented by cutting off the gas communication between the moisture removal unit 15 and the burner 16 in the vicinity of the burner 16.

A controller 10 controls the air blower 13 and the combustion fan 21 to adjust the amount of air to be sent to the cathode 12c and the burner 16, while controlling a flow rate regulating valve and an electromagnetic on-off valve (not shown) which are housed in the raw material gas feeder 19 to properly adjust the amount of raw material gas to be supplied to the fuel treating unit 11. In addition, the controller 10 controls opening and closing of the gas pipe on-off valve 18 and the water discharge electromagnetic valve 20. It should be noted that thin dot lines in FIG. 1 indicate output signals sent from the controller 10 to the objects to be controlled. Although an illustration is omitted, the controller 10 receives detection signals from various sensors (temperature sensors, flowmeters, etc.) and properly controls the operation of the fuel cell system 100 based on these detection signals.

Next, the configuration of the moisture removal unit 15 will be described in detail.

Figure 2:
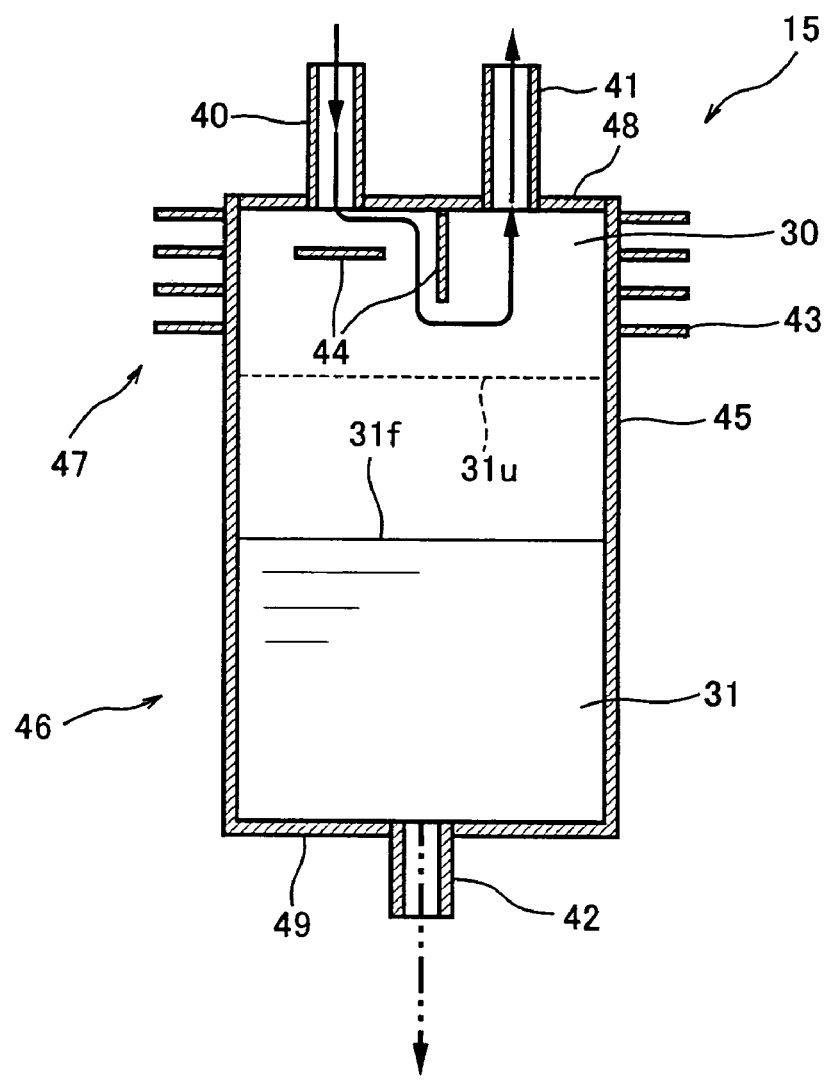
FIG. 2 is a sectional view illustrating the inner configuration of a moisture removal unit.

FIG. 2 is a sectional view of the internal structure of the moisture removal unit 15.

Referring to FIGS. 1 and 2, the moisture removal unit 15 is comprised of a tubular frame 45 having a bottom; a lid 48 for covering the upper open face of the frame 45; a plurality of radiating fins 43 formed on the outer circumferential face of the frame 45 and located in the neighborhood of the upper end of the frame 45; a tubular fuel gas inlet 40 formed in the lid 48 so as to be connected to the fuel gas return pipe 105, for guiding the fuel gas into the frame 45; a tubular fuel gas outlet 41 formed in the lid 48 so as to be connected to the combustion fuel gas pipe 106, for guiding the combustion gas, which has passed through the inside of the frame 45, to the outside; a plurality of flat baffle plates 44 provided within the frame 45 and located in the vicinity of the fuel gas inlet 40 and fuel gas outlet 41, for reducing the flow velocity of the fuel gas by interrupting the flow of fuel gas, such that dropping of water droplets contained in the fuel gas is facilitated; and a water outlet 42 provided at the bottom 49 of the frame 45 so as to be connected to the water exhaust pipe 112, for periodically guiding the condensed water 31 accumulated within the frame 45 to the outside by moisture removal.

Herein, the substantially upper half of the frame 45 of the moisture removal unit 15 has a passage area 30 (a passage for the fuel gas) formed therein through which the fuel gas (off-gas) passes. While the fuel gas is passing through the passage area 30, the upper half portion functions as a heat exchanger section 47 for effectively dissipate the heat of the fuel gas by a heat exchange with air sent from an air blowing fan (not shown) to the radiating fins 43.

The substantially lower half of the frame 45 of the moisture removal unit 15 functions as a water receiving section 46 for temporarily storing the condensed water 31 collected by aggregation of moisture contained in the fuel gas.

The temperature of the fuel gas is decreased to a value equal to or lower than its dew point by the fuel gas heat dissipation effect of the heat exchanger section 47, thereby flocculating vapor contained in the fuel gas into water droplets within the fuel gas, and these water droplets aggregate to form the condensed water 31 in the water receiving section 46.

In this way, the fuel gas cooling effect of the radiating fins 43 provided with the above passage area 30 is combined with the fuel gas deceleration effect of the baffle plates 44, thereby promoting the removal of the moisture contained in the fuel gas, so that the moisture, which could be an obstacle to the combustion of the fuel gas in the burner 16 located downstream of the moisture removal unit 15, can be properly eliminated. It should be noted that the moisture contained in the fuel gas in the specification of the present application includes both the fine water droplets and vapor contained in the fuel gas. In short, this moisture relates to the water that interferes with the combustion of the fuel gas.

The upper limit $31u$ of the water level $31f$ of the condensed water 31 is determined such that undesirable blocking of the fuel gas inlet 40 and fuel gas outlet 41 due to an excessive rise in the water level $31f$ of the condensed water 31 is prevented, thereby allowing the fuel gas to properly pass through the moisture removal unit 15. Herein, the distance from the upper limit $31u$ of the water level $31f$ of the condensed water 31 to the lid 48 is set to about 50 mm, thereby assuring the volume of the passage area 30 that enables it to satisfactorily reduce the fluid resistance of the fuel gas. Note that the water level $31f$ of the condensed water 31 is controlled by the controller 10 in accordance with a detection signal outputted from a water level detector 33 (see FIG. 3) that will be described later in detail.

Although there has been discussed a case where the fuel gas is cooled using the air blowing fan and the radiating fins 43, the heat of the fuel gas may be dissipated by cooling water which flows in a flexible pipe wound around the outer circumferential surface of the frame 45.

According to the moisture removal unit 15 described earlier, the moisture contained in the fuel gas is properly eliminated to make the fuel gas combustible by the burner 16, while assuring the fuel gas passage area 30, that is, the path for the fuel gas. In addition, the condensed water 31 that serves as a gas sealing part for preventing an escape of the fuel gas to atmosphere can be steadily accumulated in the water receiving section 46.

Next, the operation of the fuel cell system 100 having the above configuration will be described below.

First of all, the outline of the normal operation of the fuel cell system 100 will be given, followed by an explanation of a shutdown operation that is performed when an emergency stop situation (herein, a power failure is supposed to occur) arises in the fuel cell system 100 during the normal operation.

In FIGS. 1, 2, while the fuel cell system 100 is performing the normal operation (i.e., the power generation period), a hydrogen-rich fuel gas is generated by causing, within the fuel treating unit 11, a reforming reaction between the raw material gas supplied from the raw material gas feeder 19 through the raw material gas feed pipe 101 and the water supplied from a water feeding device (not shown), with the temperature of the fuel treating unit 11 being maintained at about 700° C. The fuel gas that has flown out from the fuel treating unit 11 is sent to the anode 12a of the fuel cell 12 by way of the fuel gas feed pipe 102. On the other hand, the air that has blown off from the air blower 5 is sent to the cathode 12c of the fuel cell 1 by way of the air pipe 110. In this way, power generation is done by consuming the fuel gas (hydrogen gas) and air (oxygen gas) within the fuel cell 1. The fuel gas, which has remained, without being consumed by the power generation in the fuel cell 12, is sent to the moisture removal unit 15 through the fuel gas return pipe 105 and then the moisture contained in this water is removed by the moisture removal unit 15, while the condensed water 31 being collected in the water receiving section 46. The fuel gas, which has been moisture-removed when passing through the moisture removal unit 15, then passes through the gas pipe on-off valve 18 in an open state. Thereafter, the fuel gas is sent to the burner 16 as a combustion fuel gas by way of the combustion fuel gas pipe 106. In the burner 16, this fuel gas is mixed with and diluted by the air sent from the combustion fan 21 to produce a mixed gas which is in turn combusted, thereby generating heat to be utilized as a heat source for maintaining the temperature of the fuel treating unit 11.

The condensed water 31 accumulated in the water receiving section 46 is discharged to the outside by periodically repeating opening and closing of the water discharge electromagnetic valve 20, whereby excessive accumulation of the condensed water 31 which causes blocking-up of the fuel gas passage area 30 as well as exhaustion of the condensed water 31 which causes a release of the fuel gas to the outside through the water outlet 42 can be prevented.

It should be noted that the combustion gas which has supplied heat to the fuel treating unit 11 is released to atmosphere by way of the combustion gas passage 111, whereas the air which has not been consumed by the power generation in the fuel cell 12 is released to atmosphere by way of the air pipe 110.

Next, an emergency shutdown operation performed in the event of a power failure in the fuel cell system 100 will be described.

If a power failure occurs, the inverter 14, which converts d.c. power obtained from the fuel cell 12 into a.c. power, automatically stops an output to the power load system, while the air blower 13 and the combustion fan 21 stop their operations. At the same time, the controller 10 may quickly close the electromagnetic valve for opening and closing of the raw material gas feeder 19 and the gas pipe on-off valve 18, receiving power from an auxiliary power supply of some kind, but it is desirable that such electromagnetic valve and gas pipe on-off valve 18 be constructed so as to automatically close without use of an auxiliary power supply. For instance, the gas pipe on-off valve 18 may be a normally closed type on-off electromagnetic valve that operates to close the combustion fuel gas pipe 106 when it is in a normal state. In this case, the gas pipe on-off valve 18 automatically closes in the event of a power failure and therefore there is no need to separately provide an auxiliary power supply for operating the gas pipe on-off valve 18.

With the above arrangement, the combustible fuel gas which fills the raw material gas feed pipe 101; the fuel treating unit 11; the fuel gas feed pipe 102; the anode 12a of the fuel cell 12; the fuel gas return pipe 105; and the moisture removal unit 15 is confined in these members without fail by closing the raw material gas feeder 19 and the gas pipe on-off valve 18, so that the diffusion of the fuel gas to the burner 16 can be effectively prevented.

To conduct a test for confirming the effect of such a gas pipe on-off valve 18, a power failure was deliberately caused and the leakage of the fuel gas was checked. As a result, leakage of the fuel gas (combustible gas) nor abnormalities in the fuel cell system 100 were not observed at the exhaust port 17 and other positions in the fuel cell system 100 after a shutdown of the fuel cell system 100 until the temperature of the fuel cell system 100 (e.g., the fuel treating unit 11, the fuel cell 12 and the burner 16) reaches room temperature.

By additionally closing the water discharge electromagnetic valve 20 at the time of a shutdown of the fuel cell system 100, air leak can be prevented, which air leak is caused by negative pressure attributable to a drop in the inner pressure of the fuel treating unit 11, fuel cell 12 and moisture removal unit 15 etc. when these devices decrease in temperature. In addition, the evaporation of the condensed water 31 remaining in the moisture removal unit 15 would be expected to bring the added effect of restraining the negative pressure.

According to the emergency shutdown operation of the fuel cell system 100, by closing the gas pipe on-off valve 18, the unfavorable situation can be easily securely prevented without use of an auxiliary power supply or inert gas, in which the fuel gas filling up the system 100 dispersedly leaks into the burner 16, mixing with the air that is leaking into the burner 16 through the exhaust port 17 with the result that abnormal combustion occurs in the neighborhood of the burner 16. Thus, the cause of the abnormal combustion in the neighborhood of the burner 16 can be thoroughly eliminated.

Further, thanks to the provision of the gas pipe on-off valve 18 in the combustion fuel gas pipe 106 that makes the moisture removal unit 15 and the burner 16 communicate with each other, the combustible gas in the moisture removal unit 15 can be prevented from dispersing into the burner 16 when the fuel ionization power generation system 100 is shut down.

In addition, the provision of the gas pipe on-off valve 18 in the combustion fuel gas pipe 106 that makes the moisture removal unit 15 and the burner 16 communicate with each other prevents the vapor contained in the inner gas of the moisture removal unit 15 from flowing into the burner 16, being entrained by the gas, so that accidental fire or incomplete combustion occurring at the next start of combustion in the burner 16 owing to dew condensation of the vapor can be avoided.

Second Embodiment

Figure 3:
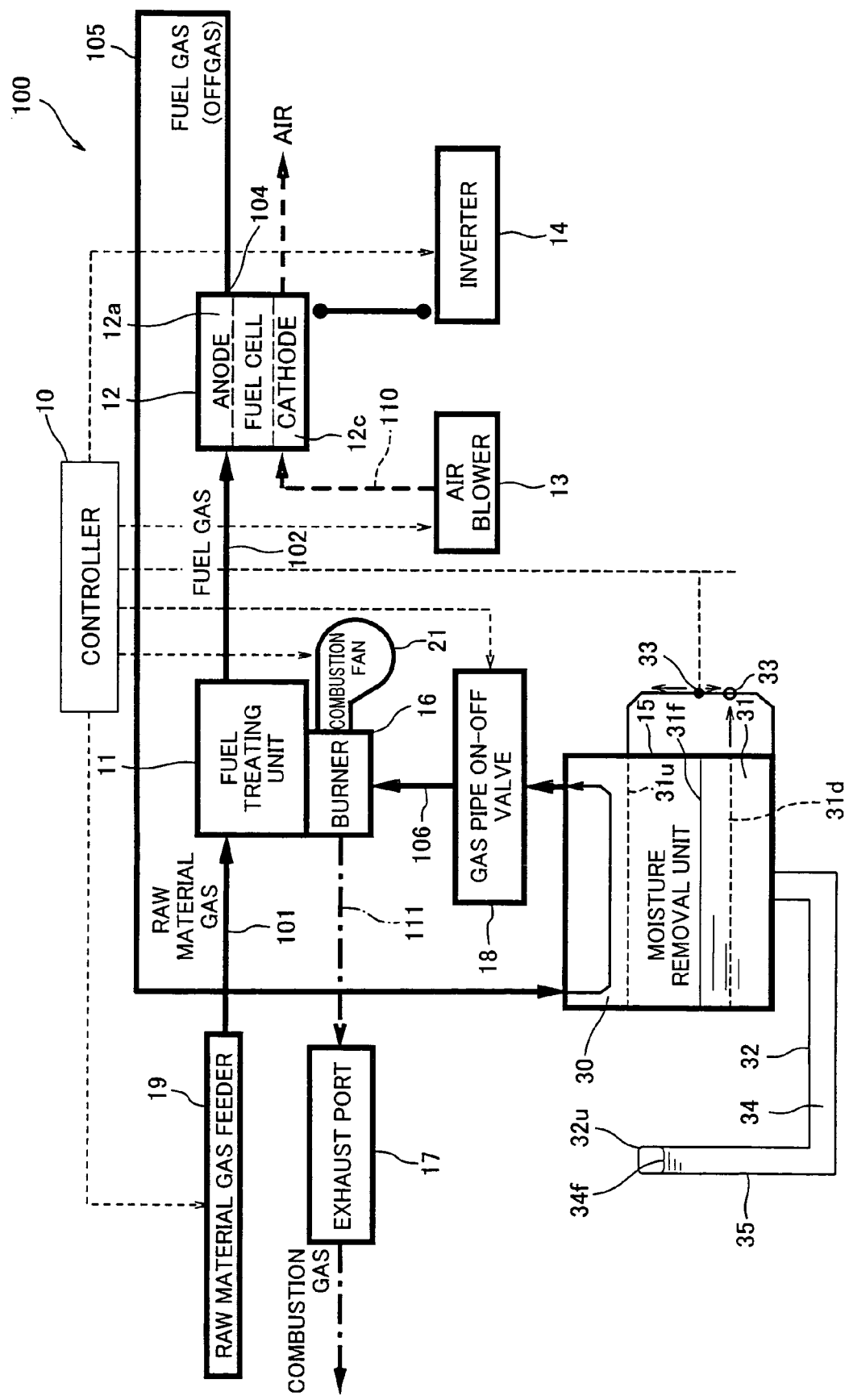
FIG. 3 is a block diagram of the configuration of a fuel cell system constructed according to a second embodiment of the invention.

FIG. 3 is a block diagram of the configuration of a fuel cell system constructed according to a second embodiment of the invention.

While the first embodiment has been discussed in terms of a case where the fuel gas filling up the fuel cell system 100 is prevented from dispersing into the burner 16 by quickly closing the gas pipe on-off valve 18 at the time of an emergency stop whereby abnormal combustion of the fuel gas in the neighborhood of the burner 16 is avoided, there are demands for a post-measure to deal with abnormal fuel gas combustion which may occur within the fuel cell system 100 owing to unexpected factors.

In a second embodiment, there will be explained the configuration of the fuel cell system 100 capable of properly outwardly releasing combustion gas (energy on combustion) resulting from abnormal fuel gas combustion if it occurs at any positions in the fuel cell system 100 at the time of shutdown.

To properly outwardly release the combustion gas that is generated in abnormal fuel gas combustion, the water discharge electromagnetic valve 20 and the water exhaust pipe 112 (FIG. 1) are excluded, while a first water passage pipe 32 extending from the bottom 49 of the moisture removal unit 15 is employed as shown in FIG. 3.

The construction of the second embodiment except the peripheral structure of the moisture removal unit 15 does not differ from that of the first embodiment and therefore an explanation of the like parts is omitted herein.

The peripheral structure of the moisture removal unit 15 will be described in detail with reference to FIGS. 2 and 3.

The peripheral structure of the moisture removal unit 15 is chiefly comprised of the first water passage pipe 32 and the water level detector 33 for detecting the water level 31f of the condensed water 31 accumulated in the water receiving section 46. The first water passage pipe 32 comprises of a water flow pipe coupled to the water receiving section 46, extending so as to form an open end 32u that is opened to atmosphere at a position higher than the water level 31f of the condensed water 31 accumulated in the water receiving section 46 when the inner pressure of the moisture removal unit 15 is positive pressure with respect to atmospheric pressure.

A float-type level switch is used as the water level detector 33 and the water level 31f of the condensed water 31 is detected based on the signal of an electromagnetic ON-OFF switch.

The first water passage pipe 32 has a mechanism that serves as a gas sealing part for sealing the fuel gas in the moisture removal unit 15. The first water passage pipe 32 is formed in substantially L shape (i.e., a pipe in U shape with one arm shortened) such that one end communicates with the water receiving section 46 through the water outlet 42 whereas the other end constitutes the open end 32u as just described above. With this pipe arrangement, the condensed water 31 accumulated in the water receiving section 46 is partly used as in-pipe water 34 that fills up the first water passage pipe 32 and the function of confining the fuel gas without use of an electromagnetic valve can be simply given to the in-pipe water 34.

The first water passage pipe 32 has a vertical portion 35 that extends to a higher position than the water level 31f in parallel with the up-and-down movement of the water level 31f of the condensed water 31. The vertical portion 35 of the first water passage pipe 32 is designed to have such length that even when the inner pressure of the moisture removal unit 15 becomes maximum, the difference in pressure between the water level 34f of the in-pipe water 34 within the first water passage pipe 32 and the water level 31f of the condensed water 31 balances with this maximum inner pressure and therefore the in-pipe water 34 is stabilized within the first water passage pipe 32.

Herein, upon assumption that the maximum inner pressure of the moisture removal unit 15 during the normal operation of the fuel cell system 100 is 2 kPa, the length of the vertical portion 35 of the first water passage pipe 32 is determined from the water level differential pressure (200 mm $H_2O$) balancing with the differential pressure corresponding to the maximum inner pressure, such that the vertical portion 35 extends at least about 200 mm from the water level 31f of the condensed water 31 remaining in the water receiving section 46. Of course, this is merely one example of the basic length of the vertical portion 35 and other lengths may be employed.

For example, in view of uncertain factors such as pressure fluctuations etc. within the moisture removal unit 15, the vertical portion 35 may vertically extend at least about 200 mm from the lower limit 31d (which is derived from the inner volume of the first water passage pipe 32 described later) of the water level 31f of the condensed water 31. This makes it possible to keep the in-pipe water 34 within the first water passage pipe 32 even when the inner pressure of the moisture removal unit 15 is at its maximum value, while keeping the water level 31f of the condensed water 31 higher than its lower limit 31d. As a result, the first water passage pipe 32 can effectively function as a gas sealing part for all the possible values that the inner pressure of the moisture removal unit 15 may take.

Now, there will be explained setting of the upper limit 31u and lower limit 31d of the water level 31f of the condensed water 31 accumulated in the water receiving section 46 of the moisture removal unit 15 according to the second embodiment.

(The Upper Limit 31u of the Water Level 31f of the Condensed Water 31)

Similarly to the first embodiment, the upper limit 31u of the water level 31f of the condensed water 31 is determined such that unfavorable blocking of the fuel gas inlet 40 and the fuel gas outlet 41 (see FIG. 2) due to an excessive rise in the water level 31f is prevented thereby allowing the fuel gas to adequately flow in the moisture removal unit 15.

More concretely, the open end 32u of the first water passage pipe 32 is located lower than the position supposed to be the upper limit 31u of the condensed water 31, in order to prevent the water level 31f of the condensed water 31 from reaching the passage area 30 for the fuel gas flowing in the moisture removal unit 15.

Thereby, the condensed water 31, the level of which is about to exceed the open end 32u, is automatically discharged to the outside (e.g., into a separated condensed water tank) through the open end 32u.

More precisely, since the moisture contained in the fuel gas is continuously removed by the moisture removal unit 15 while the fuel cell system 100 is in operation, moisture is continuously accumulated in the water receiving section 46. If the inner pressure of the moisture removal unit 15 is equal to atmospheric pressure, the water level 31f of the condensed water 31 and the water level 34f of the in-pipe water 34 are raised by replenishing water thanks to the moisture removal unit 15, while being maintained in a horizontal condition. At the point where the water level 34f of the in-pipe water 34 reaches the open end 32u of the first water passage pipe 32, the in-pipe water 34 is automatically discharged to the outside, so that the water levels 31f, 34f do not rise, exceeding this point.

Of course, if the inner pressure of the moisture removal unit 15 is positive pressure with respect to atmospheric pressure, this inner pressure raises the water level 34f of the in-pipe water 34 in the first water passage pipe 32 so as to exceed the water level 31f of the condensed water 31. Therefore, there is likelihood that the in-pipe water 34 is discharged to the outside through the open end 32u, even when the water level 31f of the condensed water 31 is sufficiently lower than the open end 32u.

(The Lower Limit 31d of the Water Level 31f of the Condensed Water 31)

The volume (V2), which corresponds to the sum of the amount of the condensed water 31 accumulated in the water receiving section 46 and the amount of the in-pipe water 34 in the first water passage pipe 32, is made greater than the volume (V1) of the first water passage pipe 32. This makes it possible to prevent exhaustion of the condensed water 31, that is, discharge of all the condensed water 31 from the water receiving section 46 when the inner pressure of the moisture removal unit 15 is within the assumable range (2 kPa or less).

In other words, even if the inner area of the first water passage pipe 32 is entirely filled with the in-pipe water 34, the condensed water 31 is allowed to remain in the water receiving section 46 by maintaining the condition represented by [the volume (V2) corresponding to the total water amount>the volume (V1) of the first water passage pipe 32], so that the gas sealing function of the condensed water 31 for sealing the fuel gas in the moisture removal unit 15 is not impaired.

If the condensed water 31 in the water receiving section 46 runs out, the in-pipe water 34 present in the first water passage pipe 32 is forced out by the pressure of the fuel gas of the moisture removal unit 15 so that the inside of the moisture removal unit 15 becomes communicative with atmosphere through the first water passage pipe 32.

Once the inner structure of the water receiving section 46 of the moisture removal unit 15 and the structure of the first water passage pipe 32 are determined, the volume (V1) of the first water passage pipe 32 is obtained and the lower limit 31$d$ of the water level 31$f$ of the condensed water 31 necessary for obtaining the total water amount that corresponds to the minimum volume equal to V1 is uniquely determined.

In this case, it is certainly possible to determine the position of the lower limit 31 d based on the volume corresponding to the estimated amount of the condensed water 31 obtained by subtracting the amount of water used as the in-pipe water 34 from the total water amount, provided that the volume (V2) corresponding to the total water amount=the volume (V1) of the first water passage pipe 32. With a view to allowing a margin for the amount of the condensed water 31 and easily obtaining the lower limit 31$d$, the position of the lower limit 31$d$ of the condensed water 31 may be obtained based on the equation represented by [the volume corresponding to the amount of the condensed water 31 when its water level is the lower limit 31$d$=the volume (V1) of the first water passage pipe 32].

In the second embodiment, the lower limit 31$d$ of the water level 31 is determined so as to accumulate at least 120 cc of the condensed water 31 in the water receiving section 46 where the inner volume (V1) of the first water passage pipe 32 is 80 cc. The position of the lower limit 31$d$ is detected by the water level detector 33 and, in response to a detection signal outputted from the water level detector 33, the controller 10 controls the operation (described later) of the fuel cell system 100.

The inner configuration of the moisture removal unit 15, the radiating fins 43, the fuel gas inlet 40 and the fuel gas outlet 41 do not differ from those of FIG. 2 and therefore an explanation on them will be omitted.

Next, the operation of the fuel cell system 100 associated with the first water passage pipe 32 and the water level detector 33 will be described.

First, the behavior of the fuel cell system 100 in normal operation (power generation) will be explained, but a description overlapping one that has been already made in the first embodiment will be skipped.

If the inner pressure of the moisture removal unit is a constant pressure (P1) during the normal operation of the fuel cell system 100, the water level 34$f$ of the in-pipe water 34 existing in the first water passage pipe 32 will rise toward the open end 32$u$ and then stop at a certain position within the first water passage pipe 32 as shown in FIG. 3, owing to the difference between the inner pressure (P1) of the moisture removal unit 15 and atmospheric pressure (P0).

Although the water level 34$f$ of the in-pipe water 34 continues to rise in conjunction with a rise in the water level 31$f$ of the condensed water 31 due to the fact that the moisture contained in the fuel gas is continuously removed by the moisture removal unit 15, the effect of such a water level rise will be ignored herein for simplicity of explanation.

When the inner pressure (P1) of the moisture removal unit 15 is positive pressure relative to atmospheric pressure (P0), the water level 34$f$ of the in-pipe water 34 existing in the first water passage pipe 32 is allowed to go up above the water level 31$f$ of the condensed water 31 owing to the difference between the inner pressure (P1) and atmospheric pressure (P0), while a portion of the condensed water 31 is guided as the in-pipe water 34 into the first water passage pipe 32. More specifically, the condensed water 31 decreases by the amount corresponding to the amount of the in-pipe water 34 that has been forcibly sent to the first water passage pipe 32 from the water receiving section 46 by the above differential pressure (P1−P0), whereas the water level 34$f$ of the in-pipe water 34 in the first water passage pipe 32 rises exceeding the water level 31$f$ of the condensed water 31 remaining in the water receiving section 46, so that the pressure attributable to the difference between the water level 31$f$ of the condensed water 31 and the water level 34$f$ of the in-pipe water 34 balances with the above differential pressure (P1−P0), thereby making the water level 34$f$ of the in-pipe water 34 stationary at a certain position.

If the inner pressure (P1) of the moisture removal unit 15 is at the maximum estimated value (2 kPa), the difference between the water level 34$f$ of the in-pipe water 34 and the water level 31$f$ of the condensed water 31 is kept at about 200 mm. When the inner pressure (P1) of the moisture removal unit 15 indicates the maximum value, the water level 31$f$ of the condensed water 31 becomes the lowest and stops at a specified position.

Although the position of the water level 31$f$ of the condensed water 31 when drops to the lowest value owing to the inner pressure of the moisture removal unit 15 varies depending upon the amount of originally present condensed water 31, this water level position may be controlled so as to be higher than the lower limit 31$d$ of the water level 31$f$ of the condensed water 31 which has been explained earlier. This makes it possible to assure the gas sealing function of the first water passage pipe 32.

More concretely, the behavior of the fuel cell system 100 is controlled by the controller 10 in the following way, in order to keep the water level 31$f$ of the condensed water 31 higher than the lower limit 31$d$ over the entire operation period of the fuel cell system 100 (during which the raw material gas is supplied).

The controller 10 determines whether the water level 31$f$ of the condensed water 31 is at its lower limit 31$d$ according to the presence/absence of a detection signal from the water level detector 33, the lower limit 31$d$ being derived from the inner volume (V1) of the fist water passage pipe 32. That is, the water detector 33 outputs a detection signal to the controller 10 when the water level 31$f$ of the condensed water 31 has reached the lower limit 31$d$, and the controller 10 determines according to this detection signal whether or not the supply of the raw material gas by the raw material gas feeder 19 should be continued.

More specifically, when the water level detector 33 detects the lower limit 31$d$ of the water level 31$f$ of the condensed water 31 and outputs it as a detection signal to the controller 10, the controller 10 determines that the water level 31$f$ has reached the lower limit 31$d$ at that time point and once closes the electromagnetic on-off valve for the raw material gas feeder 19 to stop the supply of the raw material gas. Thereafter, the amount of the condensed water 31 increases, and at the time the water level 31$f$ exceeds the lower limit 31$d$, the controller 10 opens the electromagnetic on-off valve for the raw material gas feeder 19, thereby restarting the supply of the raw material gas.

That is, if the water level 31$f$ of the condensed water 31 is kept higher than its lower limit 31$d$, the electromagnetic on-off valve for the raw material gas feeder 19 is opened, thereby continuing the supply of the raw material gas. If the water level 31$f$ is kept equal to or lower than the lower limit 31$d$, the electromagnetic on-off valve for the raw material gas feeder 19 is closed, thereby stopping the supply of the raw material gas. This makes it possible to prevent such an unfavorable situation that the raw material gas is supplied to continue power generation when the water in the moisture removal unit 15 runs out.

Next, there will be explained the behavior of the fuel cell system 100 when abnormal combustion occurs at any parts within the system 100 owing to an unexpected situation i.e., a power failure.

In the event of a power failure in the fuel cell system 100, the output of the inverter 14 to the power load system automatically stops similarly to the first embodiment, which inverter 14 converts d.c. power obtained from the fuel cell 12 to a.c. power. Simultaneously, the air blower 13 and the combustion fan 21 stop their operations. At the same time, the electromagnetic shutoff valve for the raw material gas feeder 19 and the gas pipe on-off valve 18 are quickly closed as described earlier, so that occurrence of abnormal fuel gas combustion in the vicinity of the burner 16 can be properly restrained and a spread of abnormal combustion can be stopped from happening.

To this end, the inside of the fuel cell system 100 is maintained in a hermetically closed condition. Therefore, there is the possibility that if abnormal combustion of the fuel gas occurs at any parts within the fuel cell system 100, a rapid pressure rise is caused within the fuel cell system 100.

To properly cope with a rapid rise in the inner pressure of the fuel cell system 100 caused by such abnormal combustion gas, the first water passage pipe 32, which functions to seal the gas during normal operation, contrarily serves as a safety valve (gas pressure escape mechanism) for allowing the pressure attributable to the gas (e.g., combustion gas) prevented from flowing by closing the gas pipe on-off valve 18 to escape to the outside (atmosphere).

More concretely, the condensed water 31 accumulated in the water receiving section 46 and the in-pipe water 34 existing in the first water passage pipe 32 are blown off to the outside by the rapid pressure rise due to such combustion gas. Thereafter, the inside of the moisture removal unit 15 communicates with atmosphere through the first water passage pipe 32. Accordingly, the first water passage pipe 32 functions as a gas pressure escape path. Therefore, the abnormal combustion gas within the fuel cell 12, for instance, once flows into the moisture removal unit 15 by way of the fuel gas return pipe 105 and is then released to atmosphere through the first water passage pipe 32. In this way, the inside of the fuel cell system 100 can be quickly released from the high-pressure condition and the inner pressure thereof rapidly can drop to the level of atmospheric pressure.

To check the gas pressure escape effect of the first water passage pipe 32, an abnormal combustion occurrence test was made, in which while the fuel cell system was hermetically closed (more concretely, the electromagnetic on-off valve for the raw material gas feeder 19 and the gas pipe on-off valve 18 are closed), fuel gas combustion was deliberately caused within the fuel cell system 100. In this test, damage to the joints and sealed portions of the fuel cell system 100 was checked, but no trouble was found in these parts.

With the above-described behavior of the fuel cell system 100, even if the inner pressure of the moisture removal unit 15 due to the fuel gas changes, the inner pressure fluctuation can be offset by the vertical movement of the in-pipe water 34 existing in the first water passage pipe 32, while properly sealing the fuel gas in the moisture removal unit 15 by the first water passage pipe 32.

Since the controller 10 controls the operation of the fuel cell system 100, while keeping the water level 31$f$ of the condensed water 31 higher than its lower limit 31$d$, the exhaustion of the condensed water 31 during the operation (during the supply of the raw material gas) can be inhibited so that the fuel gas is prevented from being released to atmosphere without fail.

Further, in the event of an emergency stop situation such as a power failure, even if the fuel gas within the fuel cell system 100 is abnormally combusted, accompanied with a rapid rise in the inner pressure thereof which largely exceeds the maximum pressure (2 kpPa), the combustion gas generated by this fuel gas combustion can be quickly released to atmosphere through the first water passage pipe 32 together with the condensed water 31 (in-pipe water 34). At that time, the first water passage pipe 32 properly serves as a gas pressure escape mechanism which functions without an auxiliary power supply in case of a power failure. The gas pressure escape mechanism utilizing the water-seal described above is particularly useful since it enables stable gas sealing even if popping pressure (set value) is low, compared to gas pressure escape valves utilizing a known rubber seal.

Third Embodiment

Figure 4:
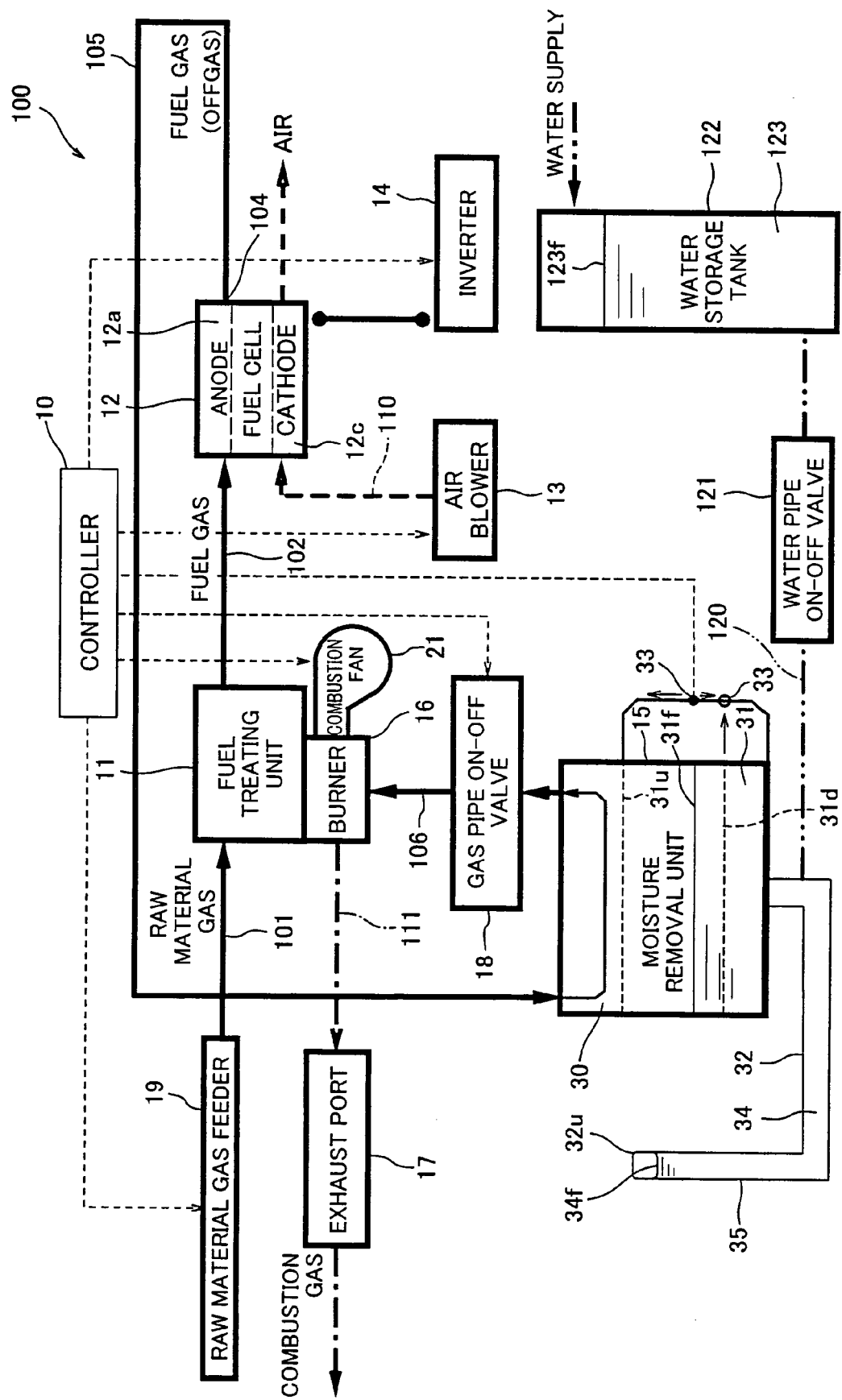
FIG. 4 is a block diagram of the configuration of a fuel cell system constructed according to a third embodiment of the invention.

FIG. 4 is a block diagram illustrating the configuration of a fuel cell system constructed according to a third embodiment.

While the lower limit 31$d$ of the water level 31$f$ of the condensed water 31 accumulated in the water receiving section 46 has been explained in the second embodiment, there will be explained in the third embodiment a prompt measure (recovery) for dealing with a case where the water level 31$f$ of the condensed water 31 is below the lower limit 31$d$.

The fuel cell system 100 of the third embodiment is chiefly comprised of a water storage tank 122 for storing water in an amount equal to or more than a predetermined amount; a second water passage pipe 120 comprising of a water flow pipe that makes the water receiving section 46 and the water storage tank 122 communicate with each other; and a water pipe on-off valve 121 disposed in the second water passage pipe 120.

Reserve water 123 is properly replenished to the water storage tank 122 from an outside water feeding device (not shown), whereby the water level 123$f$ of the reserve water 123 is constantly kept higher than the lower limit 31$d$ (i.e., the water level derived from the inner volume (V1) of the first water passage pipe 32 in the second embodiment) of the water level 31$f$ of the condensed water 31 accumulated in the water receiving section 46.

Therefore, if the water level 31$f$ of the condensed water 31 becomes lower than the lower limit 31$d$ as the amount of the condensed water 31 decreases because of, for example, the prolonged storage of the fuel cell system 100, the water pipe on-off valve 121 is opened so that the water is replenished to the water receiving section 46 from the water storage tank 122 until the water level 31$f$ of the condensed water 31 exceeds the lower limit 31$d$.

In the third embodiment, the water level 123$f$ of the reserve water 123 is controlled by the controller 10 such that it is 220 mm higher than the lower limit 31$d$ of the water level 31$f$ of the condensed water 31.

The water pipe on-off valve 121 may be a normally-open type on-off valve that operates to open the second water pipe valve 120 when it is in a normal state and more particularly an electromagnetic on-off valve that closes the second water passage pipe 120 when current is applied to the valve and opens the second water passage pipe 120 when current application is stopped.

Thereby, the water pipe on-off valve 121 can automatically open without use of an auxiliary power supply even if an unexpected situation such as a power failure occurs. And, if the condensed water 31 runs short, the water receiving section 46 can be replenished with water from the water storage tank 122 smoothly.

The configuration except the second water passage pipe 120, the water pipe on-off valve 121 and the water storage tank 122 does not differ from those of the first and second embodiments and therefore an explanation thereof will be omitted.

Next, the behavior of the fuel cell system 100 associated with the water pipe on-off valve 121 and the water storage tank 122 will be described.

During the normal operation (power generation) of the fuel cell system 100, the controller 10 makes a check to determine based on a detection signal outputted from the water level detector 33 whether the water level 31$f$ of the condensed water 31 in the water receiving section 46 is higher than the above-described lower limit 31$d$ that is derived from the inner volume (V1) of the first water passage pipe 32 and serves as a threshold value for the condensed water 31.

If the water level 31 f of the condensed water 31 is higher than the lower limit 31$d$, the controller 10 keeps the water pipe on-off valve 121 in its closed condition to continue the operation of the fuel cell system 100 without replenishing the water receiving section 46 with the reserve water 123 of the water storage tank 122.

On the other hand, if the water level 31$f$ is equal to or lower than the lower limit 31$d$, the controller 10 controls the raw material gas feeder 19 so as to once stop the supply of the raw material gas (i.e., the operation of the fuel cell system 100 is stopped), and then opens the water pipe on-off valve 121 to cause a portion of the reserve water 123 of the water storage tank 122 to flow into the water receiving section 46 for water replenishment, thereby effectively increasing the amount of the condensed water 31.

At the time point when the water level 31$f$ of the condensed water 31 exceeds the lower limit 31$d$, the controller 10 stops the water replenishment for the condensed water 31 by closing the water pipe on-off valve 121, while controlling the raw material gas feeder 19 to restart the supply of the raw material gas, thereby restarting the normal operation (power generation) of the fuel cell system 100.

Thus, it becomes possible to properly maintain the water level 31$f$ of the condensed water 31 in the water receiving section 46 so as to exceed the lower limit 31$d$, when the fuel cell system 100 is in operation (i.e., during the supply of the raw material gas); to assure a sufficient amount of the condensed water 31 to avoid drying-up of the moisture removal unit 15; and to prevent the fuel gas from leaking to the outside through the water outlet 42 of the moisture removal unit 15 without fail.

Additionally, the controller 10 determines whether the supply of the raw material gas is necessary by checking the water level 31$f$ of the condensed water 31 and enables quick replenishment of water from the water storage tank 122 if the condensed water 31 runs short, whereby the efficiency of the operation of the fuel cell system 100 can be increased.

While the forgoing description is associated with a case where the operation of the fuel cell system 100 is controlled by the controller 10 based on the water level 31$f$ of the condensed water 31, the controller 10 may stop the supply of the raw material gas through the raw material gas feeder 19 if the controller 10 detects troubles such as short circuit or breaking in the water level detector 33.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention.

INDUSTRIAL APPLICABILITY

The fuel cell system of the invention is capable of performing an appropriate, expeditious shutdown operation in the event of an emergency stop situation such as a power failure in the fuel cell system and therefore can be suitably used as a power generation system for household purposes.

The invention claimed is:

1. A fuel cell system comprising:
   a fuel cell configured to generate power by consuming a fuel gas and having an outlet port through which the fuel gas that has not been consumed in the power generation flows out;
   a moisture removal unit having a water receiving section configured to accumulate condensed water generated from moisture contained in the fuel gas that has been sent through the outlet port, thereby removing the moisture contained in the fuel gas;
   a burner located downstream of said moisture removal unit, to combust the fuel gas;
   a gas pipe on off valve configured to open and close a pipe that makes said moisture removal unit and said burner communicate with each other and to close when the power generation stops;
   a fuel treating unit configured to generate the fuel gas from a raw material gas and vapor;
   a raw material gas feeder configured to supply the raw material gas to said fuel treating unit;
   a water level detector configured to detect a water level of the condensed water; and
   a controller configured to stop the raw material gas feeder based on a detection signal of said water level detector detecting that the water level is equal to or lower than a lower limit of the water level of the condensed water.

2. The fuel cell system according to claim 1, further comprising:
   a water storage tank to store the water;
   a second water passage pipe configured to make said water receiving section and said water storage tank communicate with each other; and
   a water pipe on off valve configured to open and close said second water passage pipe,
   wherein said controller opens said water pipe on off valve at least until the water level exceeds the lower limit, so that the water stored in said water storage tank is replenished to said water receiving section through said second water passage pipe.

3. The fuel cell system according to claim 1 or 2, wherein at the time the water level exceeds the lower limit, said controller controls said raw material gas feeder so as to supply the raw material gas, while closing said water pipe on off valve.

4. The fuel cell system according to claim 1, wherein at the time the water level exceeds the lower limit, said controller controls said raw material gas feeder so as to supply the raw material gas.

* * * * *